United States Patent [19]
Epworth

[11] Patent Number: 4,718,121
[45] Date of Patent: Jan. 5, 1988

[54] BALANCED COHERENT RECEIVER

[75] Inventor: Richard E. Epworth, Stortford, Great Britain

[73] Assignee: STC PLC, London, England

[21] Appl. No.: 836,795

[22] Filed: Mar. 6, 1986

[30] Foreign Application Priority Data

Mar. 7, 1985 [GB] United Kingdom ............. 8505937

[51] Int. Cl.$^4$ ............................................. H04B 9/00
[52] U.S. Cl. ..................................... 455/619; 455/617
[58] Field of Search ................... 455/619, 616, 617; 250/214 A; 329/144; 330/59, 308

[56] References Cited

U.S. PATENT DOCUMENTS

| | | | |
|---|---|---|---|
| 3,214,590 | 10/1965 | Schactman | 329/144 |
| 3,571,597 | 3/1971 | Wood et al. | 455/616 |
| 3,971,930 | 7/1976 | Fitzmaurice et al. | 455/616 |

FOREIGN PATENT DOCUMENTS 2121636 12/1983 United Kingdom .

OTHER PUBLICATIONS

ABBAS, Chan & YEE, "Cancellation of Local Oscillator Intensity, Noise Caused by the Relaxation Oscillation of GaAlAs Lasers with a Dual-Detector Heterodyne Receiver", MIT Lincoln Laboratory, 1984.

Primary Examiner—Robert L. Griffin
Assistant Examiner—Leslie VanBeek
Attorney, Agent, or Firm—Lee, Smith & Zickert

[57] ABSTRACT

In a coherent optical receiver using balanced photodetectors, local oscillator intensity fluctuations are nulled out by cross-correlating them with an imperfectly balance output to derive an error signal used in a feedback loop to optimize the balance.

6 Claims, 10 Drawing Figures

BALANCED COHERENT RECEIVER

FIELD OF THE INVENTION

This invention relates to a balanced coherent receiver and, in particular, a balanced coherent receiver for use in optical communication systems.

BACKGROUND OF THE INVENTION

The general principles of coherent detection of modulated signals is well established. In the field of optical communication systems coherent receivers using laser local oscillators and balanced detectors have been described in "Laser Receivers" by Monte Ross, published by Weily, N.Y. In that book, at pages 112-113 there is described a receiver in which an input signal plus a local oscillator reference signal is fed to one of a pair of basically identical detectors, while the input signal minus the local oscillator reference signal is fed to the other detector of the pair. The arrangement requires, in addition to a beam splitter, two half silvered mirrors, a 180° phase changer for the local oscillator signal, and a substrate circuit for the two detector outputs. The subtracted outputs from the two detectors forms the output signal.

Thus a conventional coherent optical receiver requires the summing of the received signal field $E_1$ with a larger local oscillator field $E_2$ and the resultant is detected at a photodetector PD (FIG. 1). As this has a square law sensitivity $(E_1+E_2)$ to field the output O/P contains a component $2E_1, E_2$ proportional to the product of the two fields. Hence, the larger the local oscillator field $E_2$ the greater the coherent gain. With an ideal local oscillator of great magnitude, the sensitivity is only limited by the quantum noise. However, in practice the local oscillator has some level of unwanted amplitude modulation (intensity noise) which appears in the component $I_2$ and the larger the LO, the greater the AM noise which is coupled to the receiver output.

Previously it has been proposed that a balanced receiver would allow the AM noise to be balanced out. In British patent application No. 2121636A there is described a coherent optical receiver where the two outputs of the mixer are both detected and summed in antiphase in the receiving amplifier. This cancels large photocurrent variations due to the local oscillator.

The balanced input receiver is shown in FIG. 2 and is attractive as it minimizes the effect of stray capacitance in a two-detector receiver $PD_1$, $PD_2$ and it pulls out the large local oscillator (LO) dc photocurrent component which would otherwise cause problems of receiver dynamic range.

Alternatively, it may be achieved by electrically balancing the gains of two independent receivers as is described by ABBAS. G. et al in paper TUAS, pp 34, 35, Proc. OFC '84 and shown in FIG. 3.

The degree to which LO intensity fluctuations can be suppressed is determined by the accuracy of the balancing. A 10% error in (intensity) balance will produce a factor of ten improvement, 1% a factor of 100 etc. A perfect balance would be ideal but there are several impediments in achieving this. Couplers (power dividers) are usually sensitive to temperature and stress, pairs of photodetectors may have differing responsivity and fiber-to-detector losses may differ. Even if the balance can initially be set up to the optimum, small changes in ambient conditions will upset this, so there is little chance of obtaining sufficiently accurate and stable balancing to allow the fluctuations in a large local oscillator signal to be suppressed.

SUMMARY OF THE INVENTION

According to the present invention there is provided a coherent optical receiver in which local oscillator intensity fluctuations are cross-correlated with the output of the receiver in imperfect balance to derive an error signal which is used to optimize the balance through a feedback control circuit.

BRIEF DESCRIPTION OF THE DRAWING

In order that the invention can be clearly understood, reference will now be made to the accompanying drawings, in which:

FIG. 1 is a block diagram of a single ended coherent receiver according to the prior art and already referred to;

FIG. 2 is a block diagram of a balanced receiver with a single low noise amplifier also according to the prior art and already referred to;

FIG. 3 is a block diagram of a balanced receiver with separate low noise amplifiers and electrical balancing circuits according to the prior art and already referred to;

DETAILED DESCRIPTION OF A PREFERRED EMBODIMENT

Figure 1:
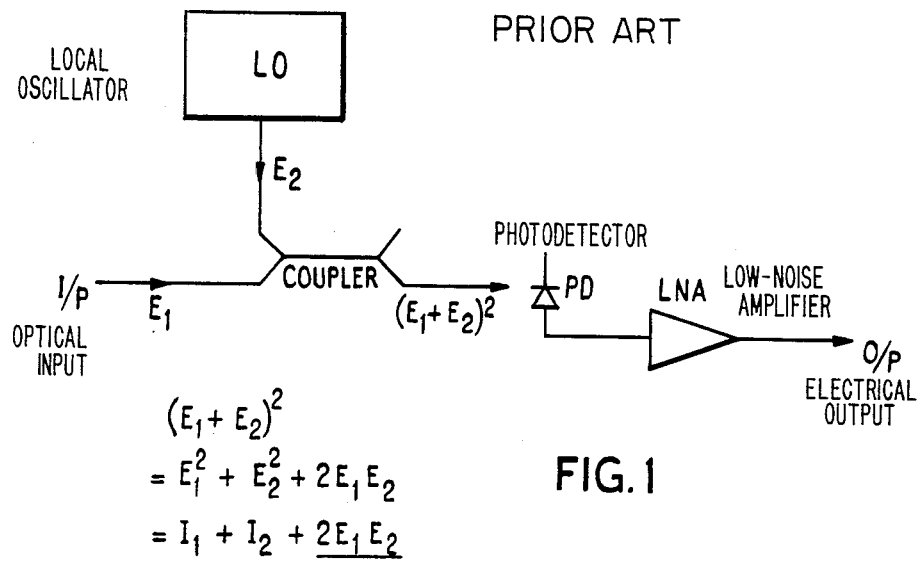
Figure 2:
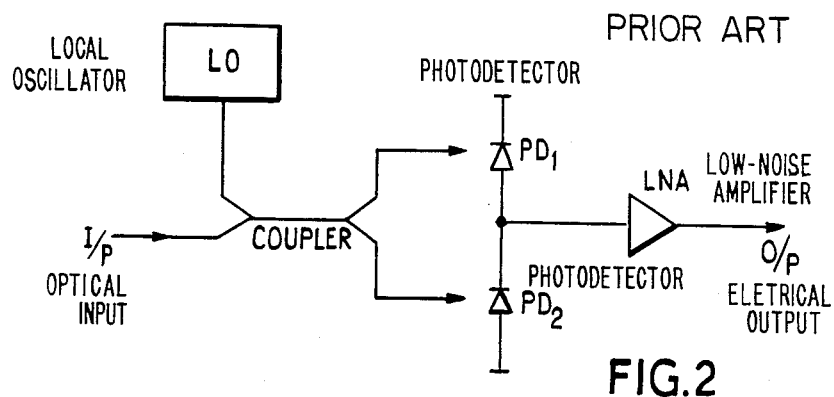
Figure 3:
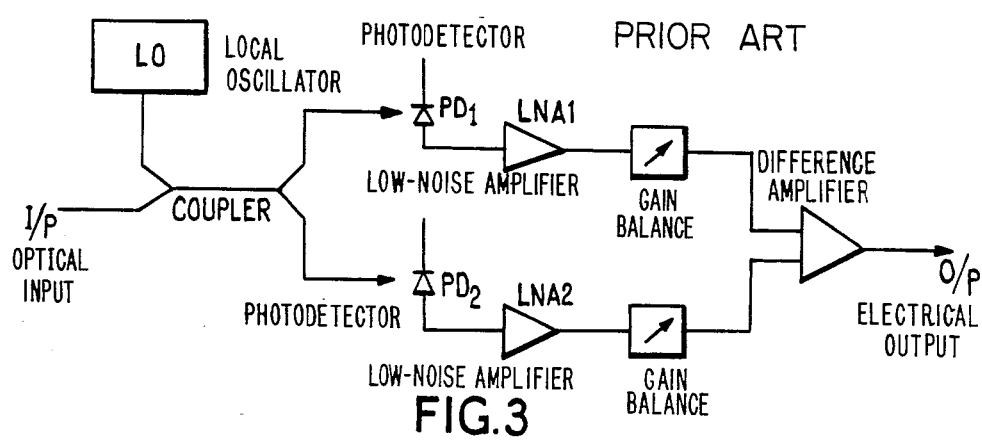
Figure 4:
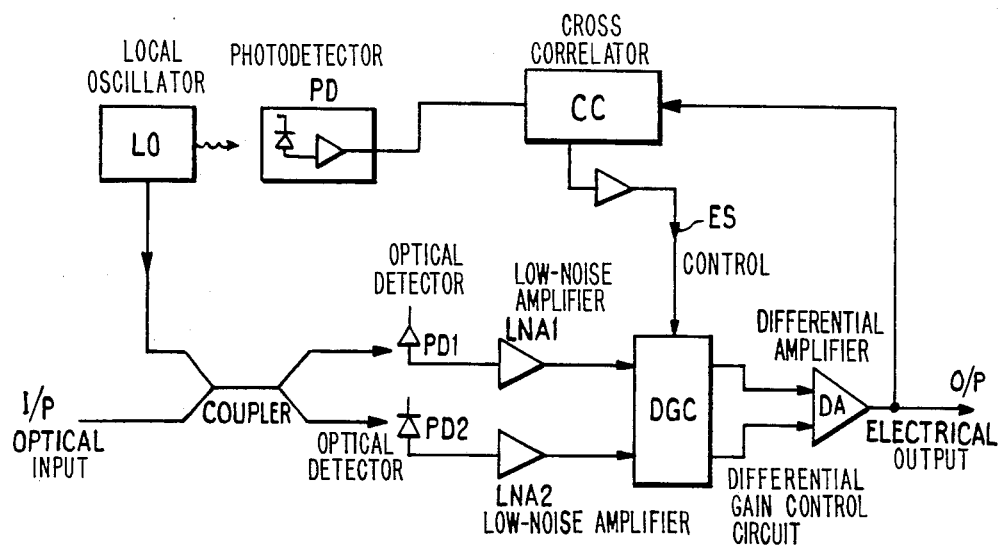
FIG. 4 is a block diagram of a coherent receiver according to an embodiment of present invention.

Referring to FIG. 4 the receiver comprises a local oscillator LO, a photodetector PD for monitoring optically the local oscillator, and a cross-correlator CC for correlating the monitor output with the electrical signal output from a differential amplifier DA.

The optical input signal I/P and local oscillator signal are fed to an optical coupler which can for example be a half-silvered mirror beam combiner or, preferably, a coupler fabricated from fiber using a fused biconical taper technique.

The products of the combiner are applied to respective optical detectors PD1, PD2 which provide outputs to low noise amplifiers LNA1, LNA2 and these feed amplified signals to a variable differential gain control circuit DGC which is subject to an error control signal ES from the cross-correlator CC. The inbalance error control signal is derived by monitoring the unwanted local oscillator fluctuations with the separate photodetector PD and cross-correlating this with the receiver output signal. The output of the correlator is the required error signal ES and this adjusts the balance through the variable differential gain control circuit DGC whose output is amplified in differential amplifier DA.

Figure 5A:
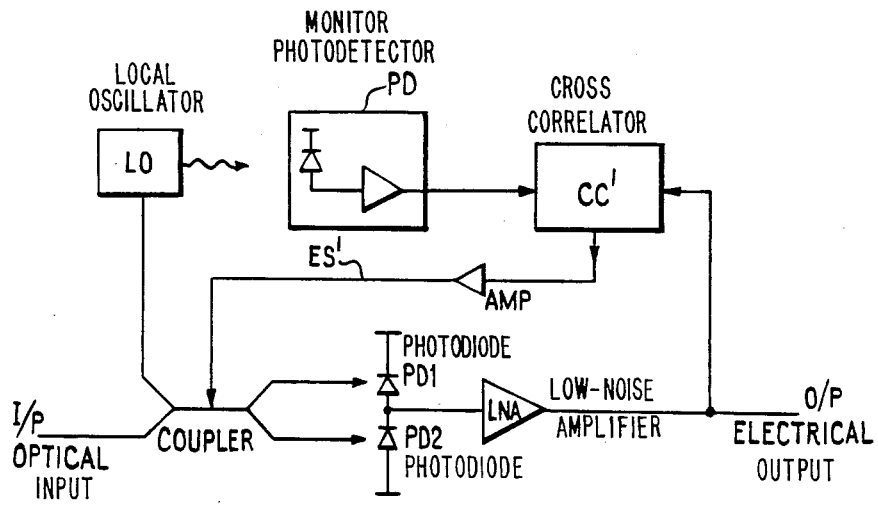
FIG. 5A is a block diagram of a coherent receiver according to another embodiment of the invention.

An alternative approach to deriving the error signal is shown in FIG. 5A, in which is shown correlation feedback control of an optically balanced receiver. Here the local oscillator LO output and the optical input signal I/P are fed to an optical fiber coupler whose coupling ratio is controllable by a mechanism such as temperature stress voltage (e.g. lithium niobate) and the outputs from the coupler are fed to photodiodes PD1, PD2 and amplified in low noise amplifier LNA. The output is sensed by a cross-correlator CC' which cross-correlates the electrical output signal O/P with the local oscillator unwanted fluctuations via monitor photodetector PD and the correlator output is amplified in amplifier AMP to provide the error control signal ES' to control the coupler ratio.

For the arrangement of both FIG. 4 and FIG. 5A, if the path delays are reasonably matched then the correlator CC and CC' may be simplified to a multiplier and an integrator.

Figure 5B:
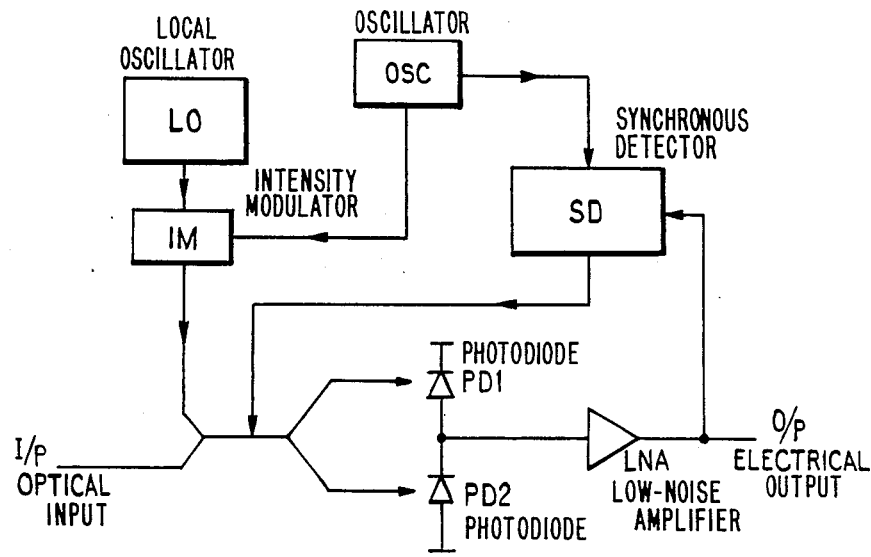
FIG. 5B is a block diagram of a modification of the receiver of FIG. 5A.

In an alternative approach a small known modulation signal is impressed upon the local oscillator and the output of the receiver is synchronously detected using this signal. This is shown in FIG. 5B where the local oscillator LO output is applied to an intensity modulator IM for modulation by an oscillator OSC. Alternatively, the local oscillator amplitude could be directly amplitude modulated. This oscillator also controls a synchronous detector SD. The optical input signal and the modulated local oscillator signal are applied to the optical fiber coupler where the coupling ratio is controlled by the output of the synchronous detector SD. The coupler output is received by photodiodes PD1, PD2 and amplified by low noise amplifier LNA. This arrangement provides feedback control of an optically balanced receiver using low level of deliberate amplitude modulation of the local oscillator and synchronous detection of error signal in output. An advantage of this approach is that balancing will occur irrespective of the magnitude of the amplitude noise of the local oscillator.

Figure 6:
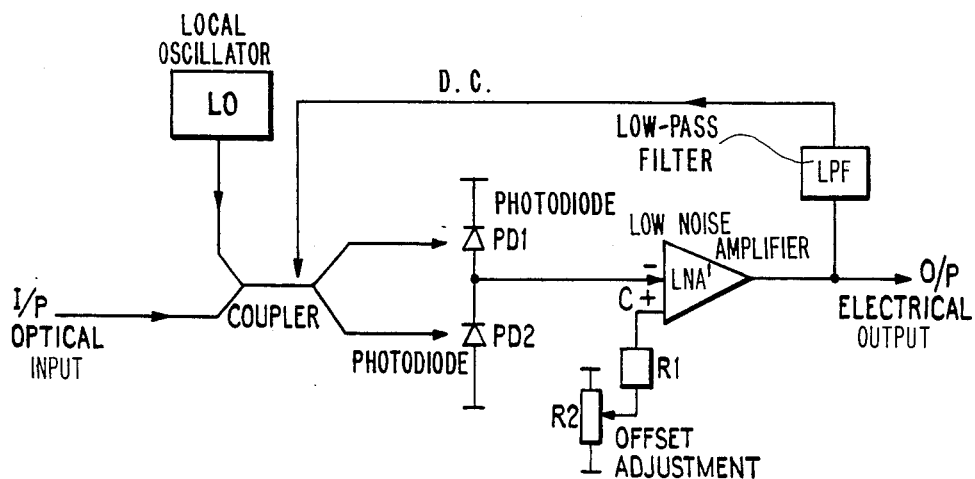
FIG. 6 is a block diagram of a coherent receiver according to a further embodiment of the invention.

A further, simpler arrangement is also possible and this is shown in FIG. 6.

Referring to FIG. 6 the optical signal input I/P and local oscillator LO output are fed to the optical fiber coupler whose outputs are received by photodiodes PD1, PD2. A low noise amplifier LNA' has a d.c. bias control C at which offset adjustment can be effected with resistor R1, R2. Control of the coupling ratio is effected by a signal derived from the electrical output signal O/P via low pass filter LPF, to affect the temperature stress, voltage, as proposed in FIG. 5A.

This provides correlation feedback control of an optically balanced receiver using d.c. output of the receiver, the d.c. component of the output being a direct measure of the optical imbalance and fed back to close the loop and balance the system. Any detector leakage which may cause errors in balancing can be minimized at a given temperature by the offset adjustment at control C.

Figure 7A:
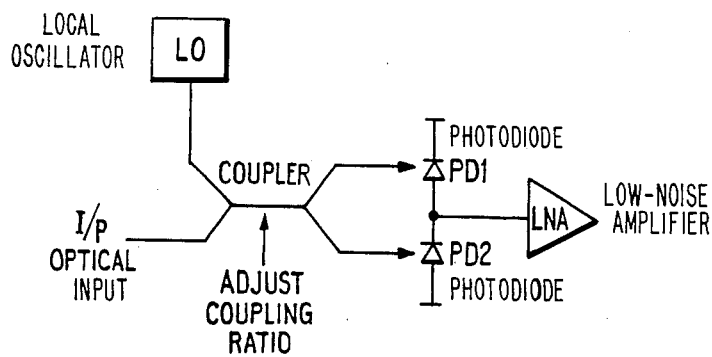
FIGS. 7A-C shows three ways to null out the local oscillator fluctuations by balancing the receiver.

Referring now to FIG. 7 there are shown three ways in which the receiver can be balanced to null out local oscillator intensity fluctuations. The arrangement of FIG. 7A has already been discussed in FIG. 5A and FIG. 6 where the coupling ratio of the coupler is adjusted by e.g. change in temperature, by bending, or in integrated optics form by voltage.

Figure 7B:
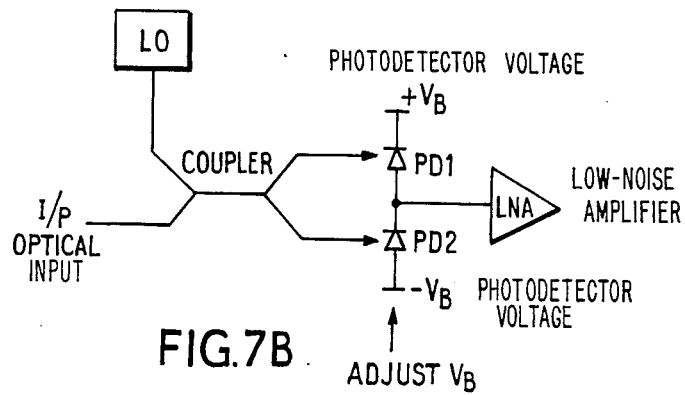

FIG. 7B proposes an alternative in which the voltages of detectors PD1, PD2 i.e. $+V_B$ and $-V_B$ are adjusted which in turn will adjust for detector responsivity.

Figure 7C:
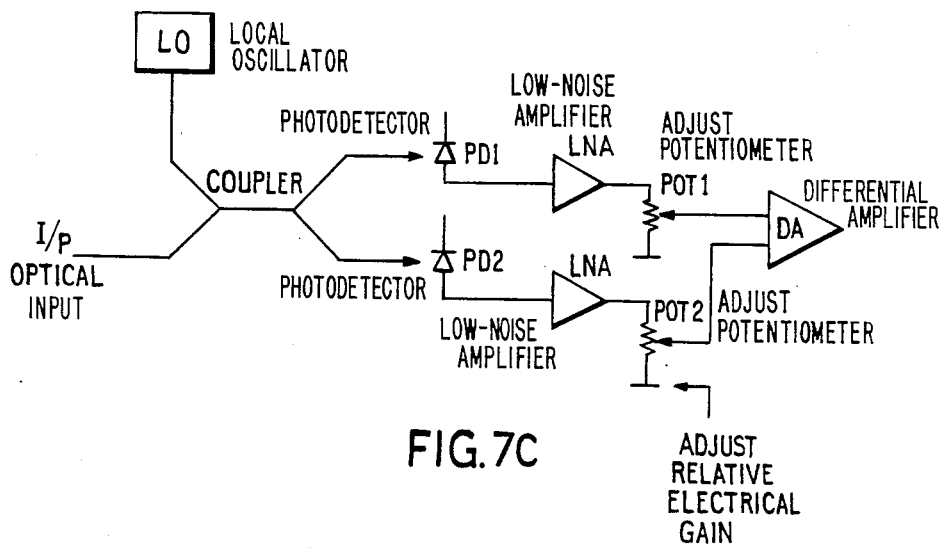

FIG. 7C proposes the use of a differential amplifier DA fed from adjustable potentiometers POT1, POT2 to adjust the relative electrical gain of the signal from the detectors PD1, PD2.

I claim:

1. A coherent optical receiver having an electrical signal output, an optical information signal input, an optical local oscillator, first means coupled to the optical input and the local oscillator and arranged to produce out-of-phase signals in respective channels accompanied by in-phase signals and to derive the electrical output signal therefrom, and second means coupled to the signal output and arranged to derive an error signal representative of the imbalance of the in-phase signals, and a feedback control circuit connected to receive the error signal and which is used to adjust the balance of said in-phase signals.

2. A receiver as claimed in claim 1, said first means comprising balanced detectors and a variable differential gain circuit responsive under the control of the error to differentially adjust the ratio of the ouputs of the balanced detectors of the receiver.

3. A receiver as claimed in claim 1, wherein the first means comprises an optical coupler connected to the optical input and to the local oscillator, the coupler ratio being variable under the control of the error signal.

4. A receiver as claimed in claim 3, comprising a modulator coupled to the local oscillator to create the fluctuations and said second means comprises a synchronous detector to derive from the receiver output the error signal and apply this error signal to vary the coupling ratio of the coupler.

5. A receiver as claimed in claim 1, said first means including an optical coupler and photodetectors which receive the output of the optical coupler, the photodetector responsivity being controlled by varying the photo-detector bias voltage in dependence upon the error signal.

6. A receiver as claimed in claim 1, wherein said second means derives d.c. signal from the output of the receiver which is used as the error control signal to control the balance.

* * * * *